United States Patent Office 3,408,632
Patented Oct. 29, 1968

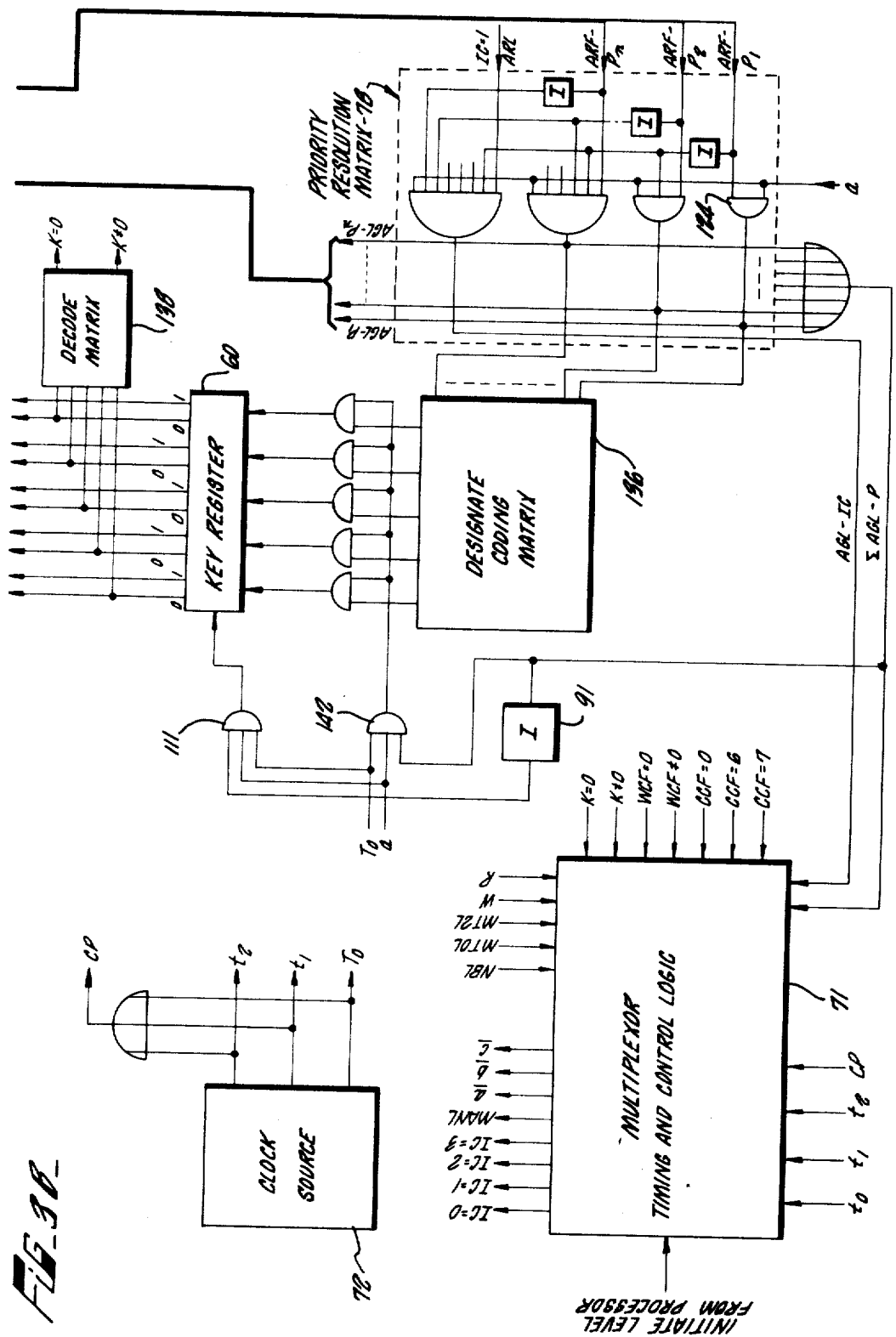

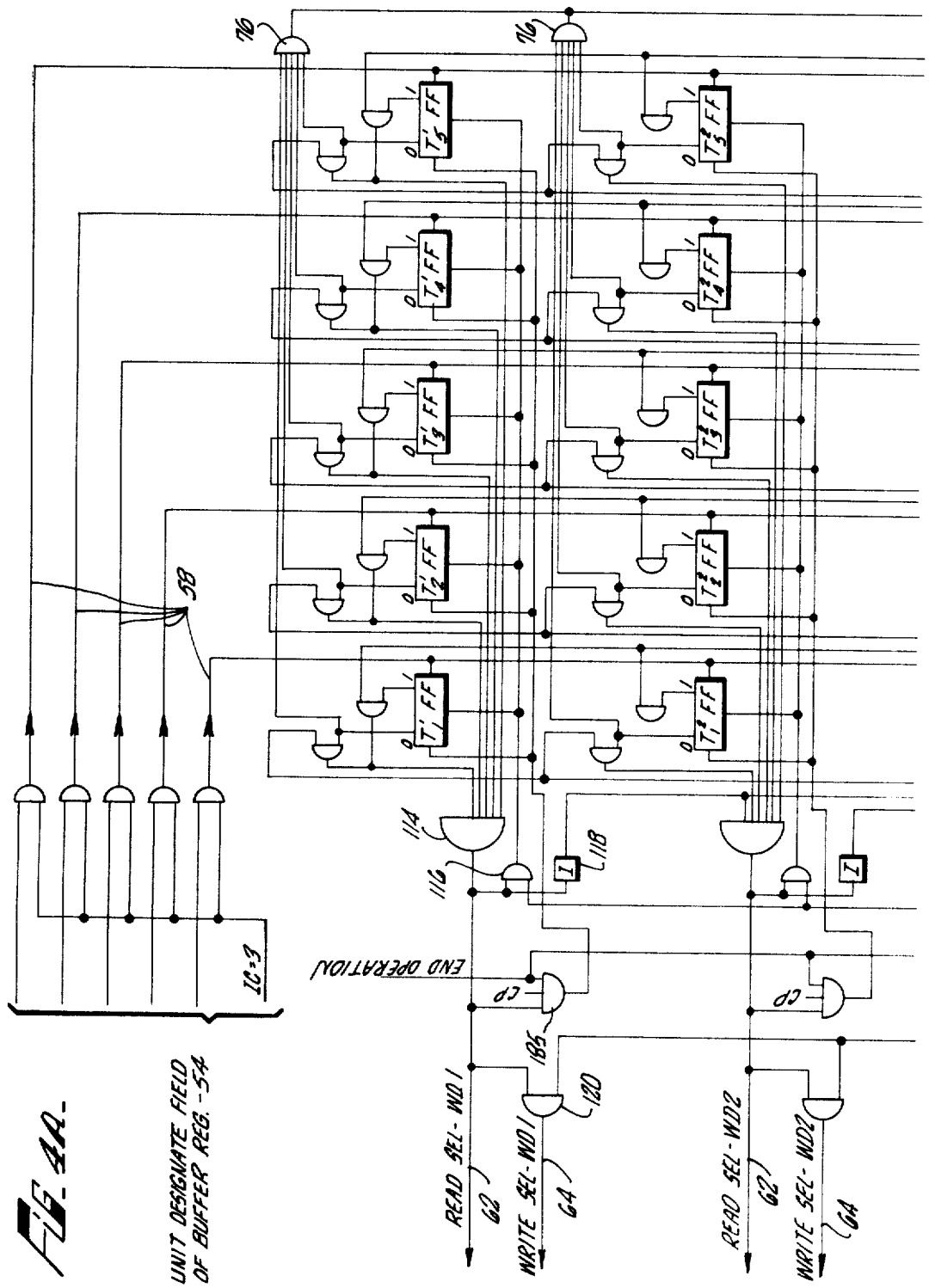

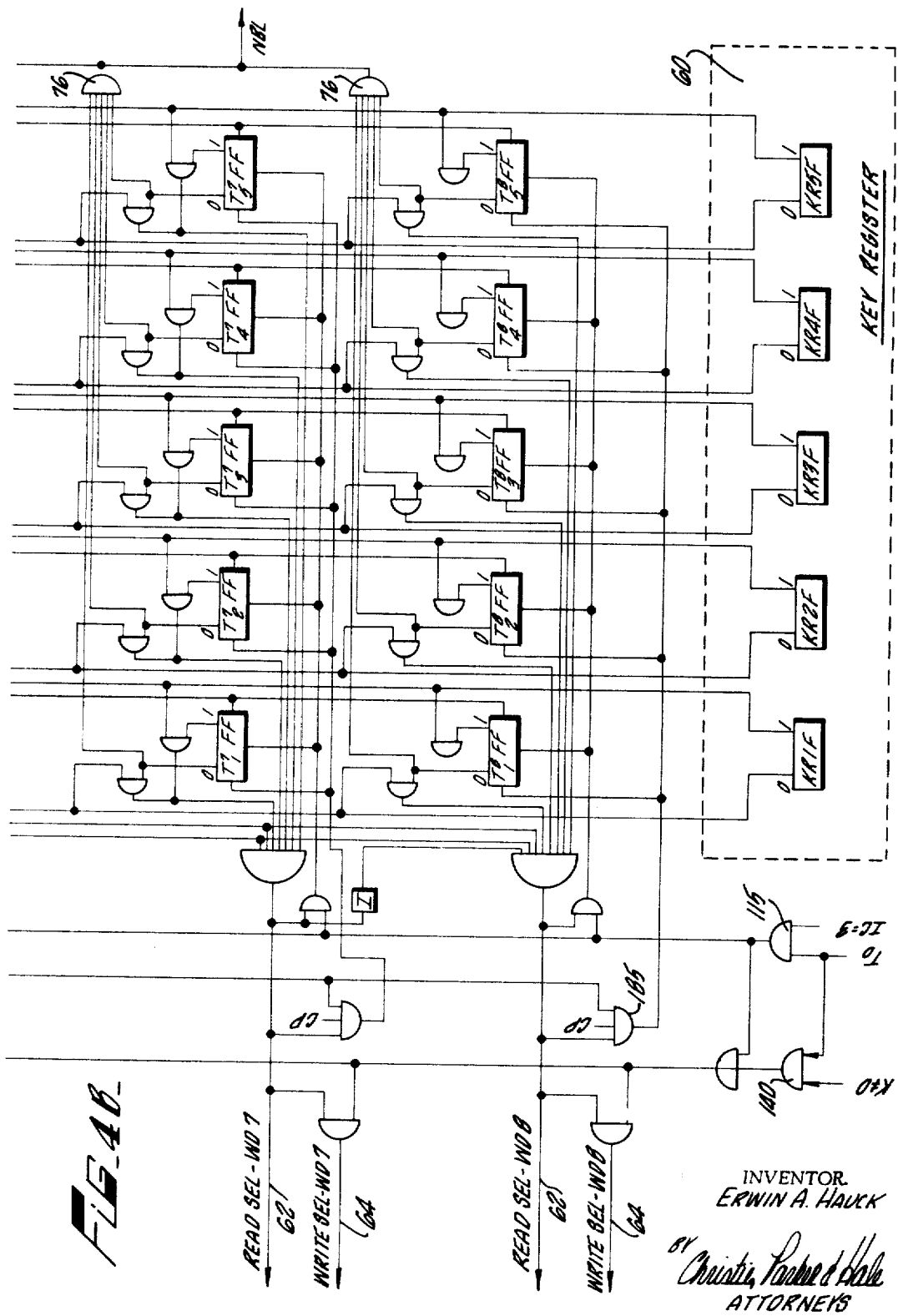

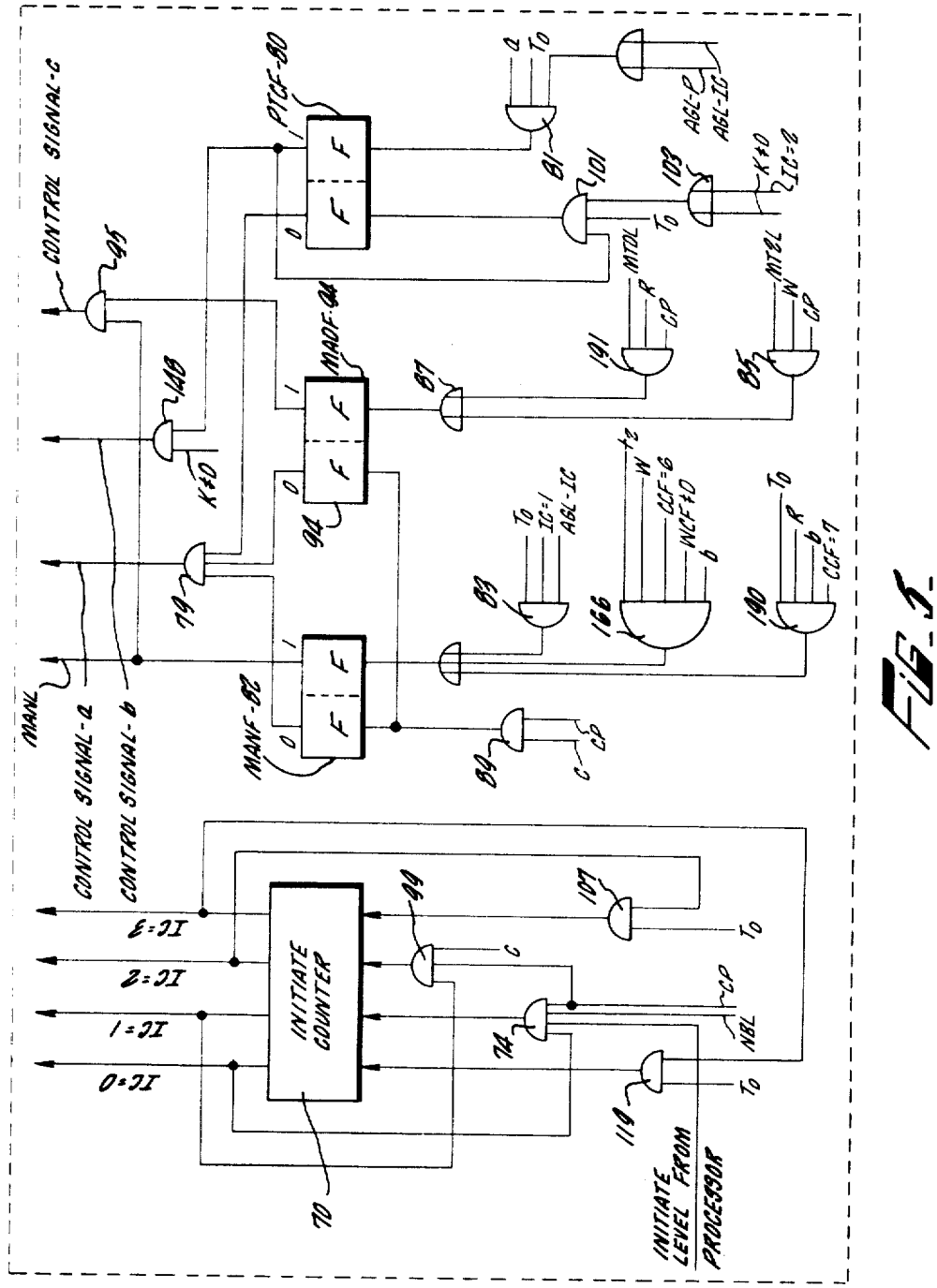

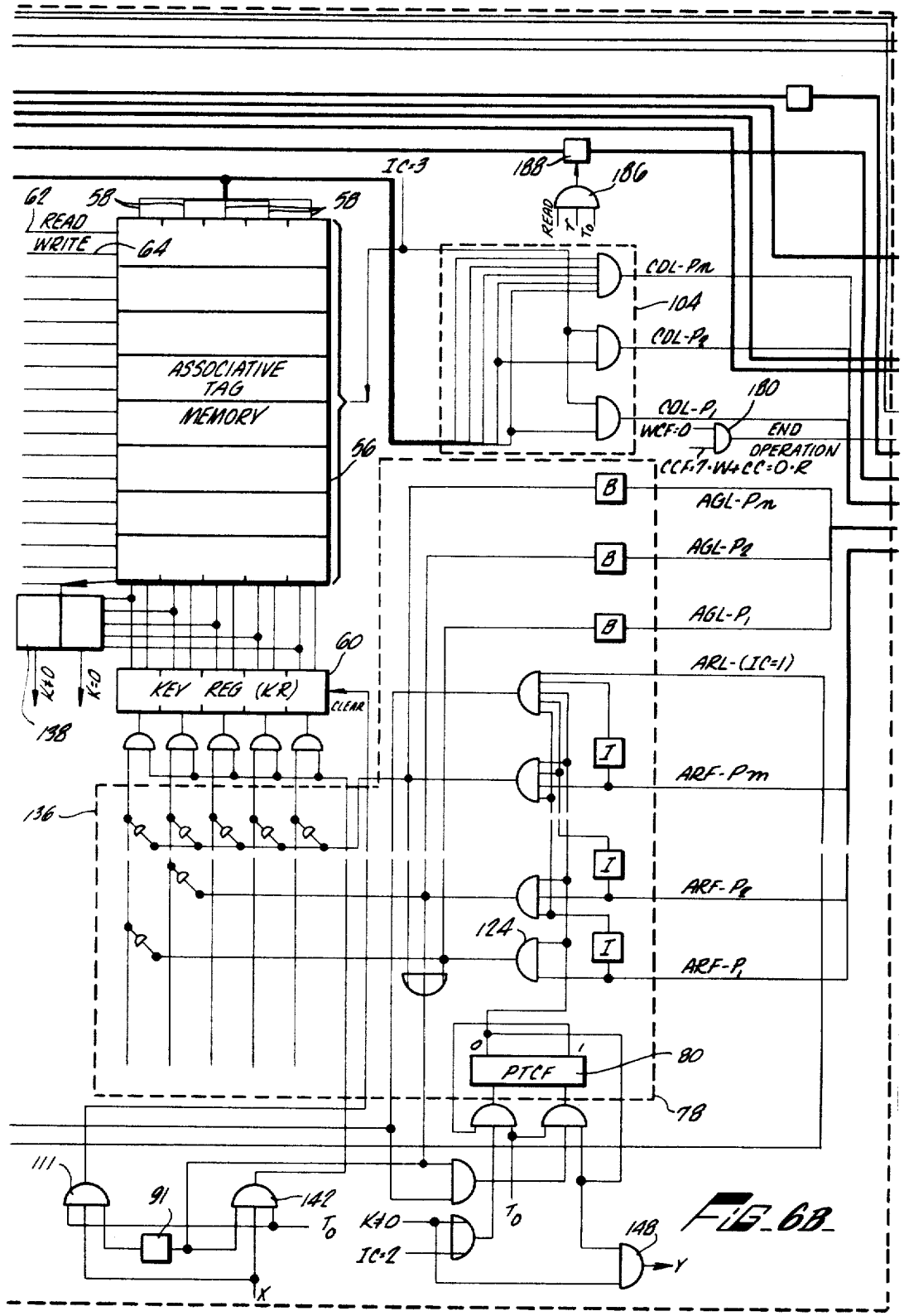
FIG_6B

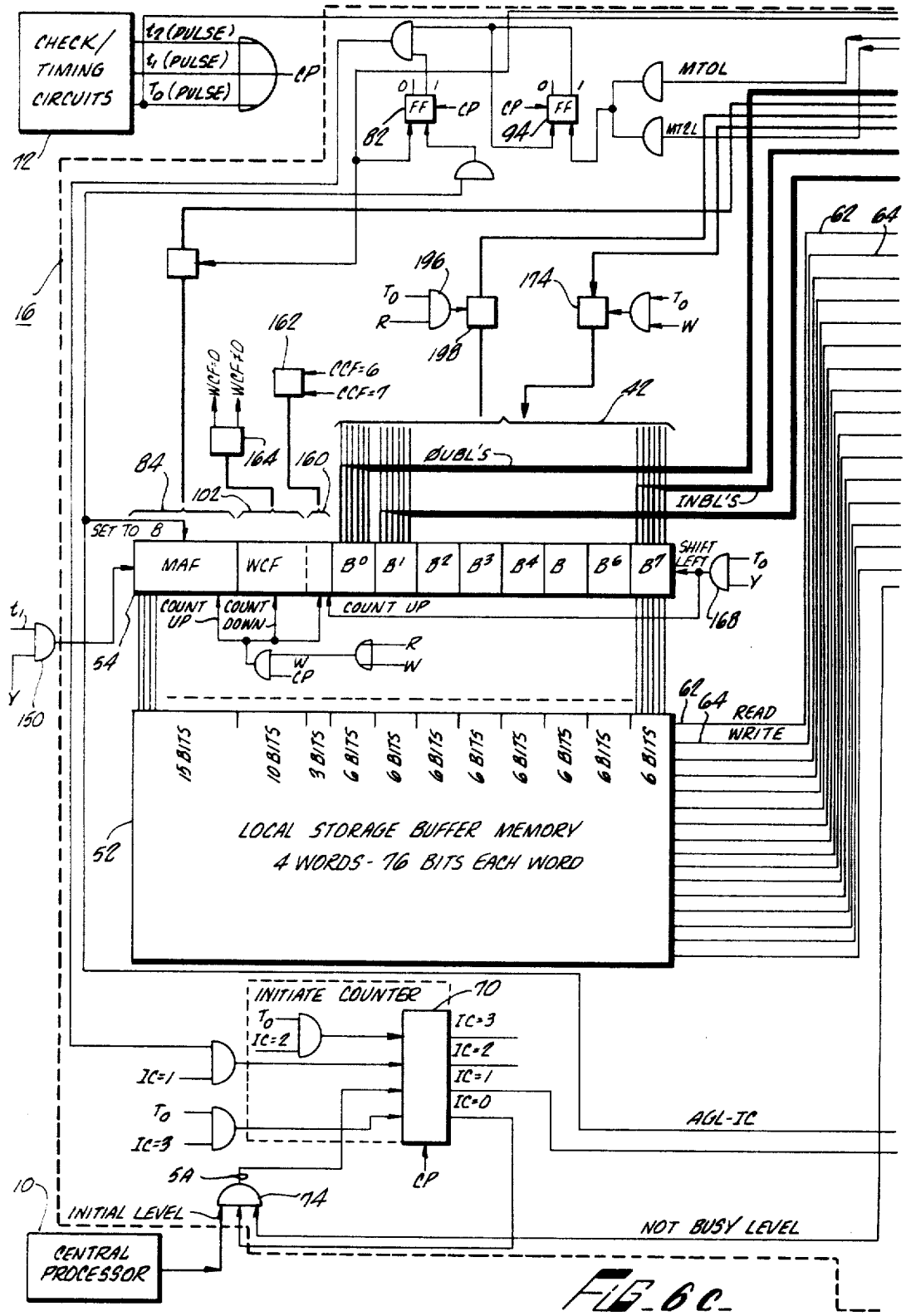

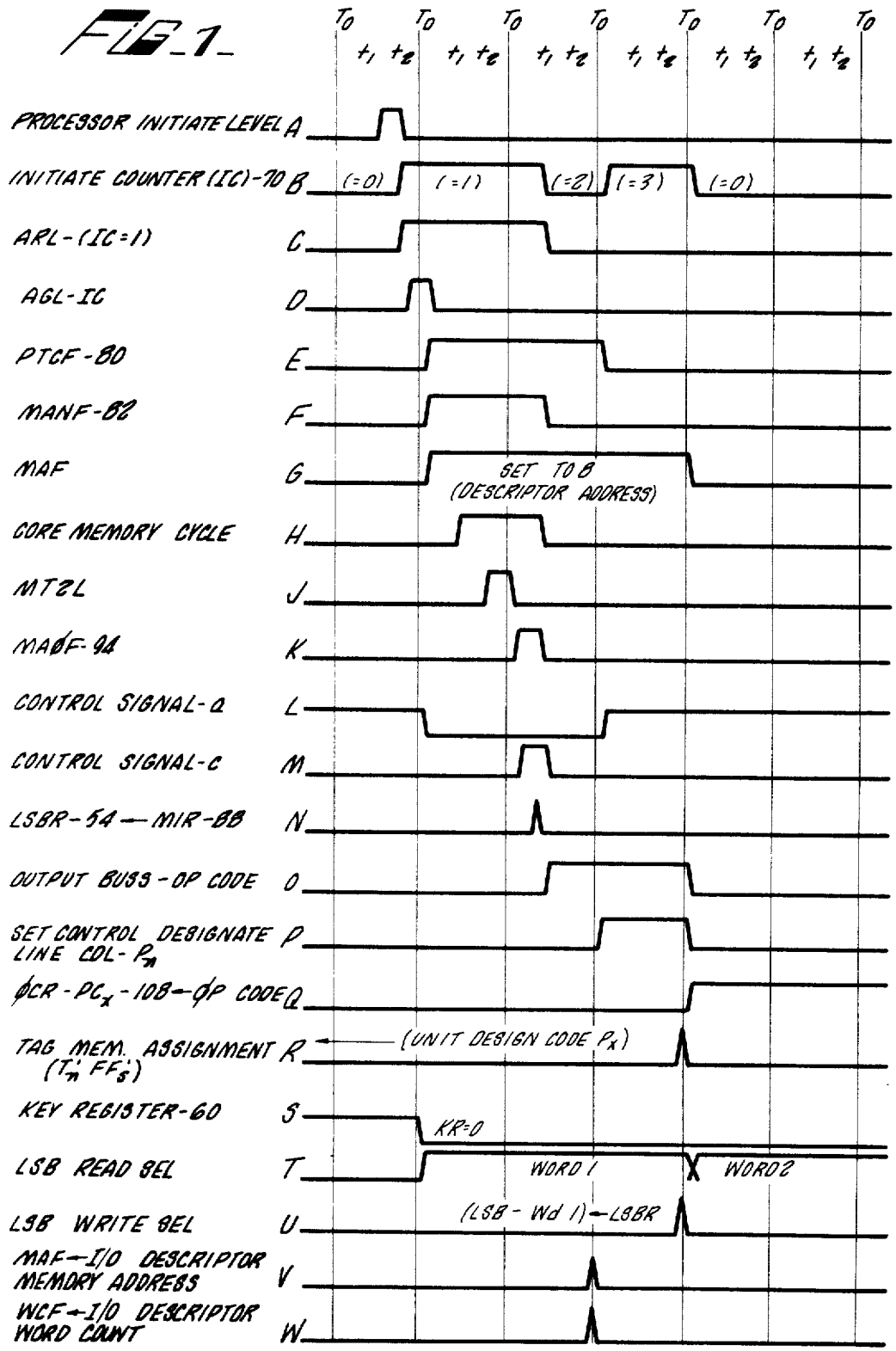

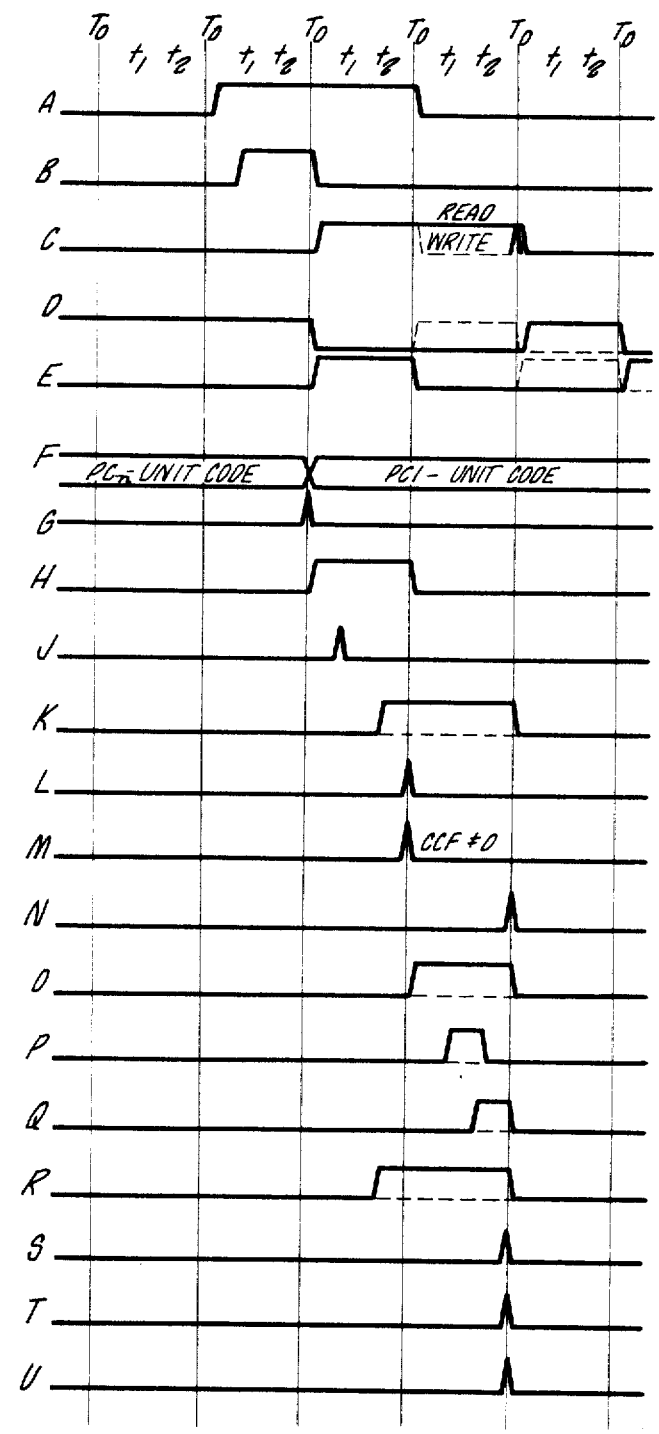

---

3,408,632
INPUT/OUTPUT CONTROL FOR A DIGITAL COMPUTING SYSTEM
Erwin A. Hauck, Arcadia, Calif., assignor to Burroughs Corporation, Detroit, Mich., a corporation of Michigan
Filed June 3, 1966, Ser. No. 555,025
10 Claims. (Cl. 340—172.5)

This invention relates to digital data processing systems and, more particularly, is concerned with a multiplexed input/output control for transferring information between a plurality of peripheral units and main memory.

Large data processing systems use a number of different peripheral units for supplying data to and receiving data from the data processing system. A single high speed data processing system should be able to accommodate a selectable number of peripheral units such as magnetic tape units, punch card readers, card punches, paper tape readers, paper tape punches, printers, data communication controls, and the like. Since different types of peripheral units operate at different speeds, it is necessary to correlate the high speed of operation of the data processors with the relatively slow speed of the peripheral units in order to achieve maximum efficiency while maintaining complete flexibility of system configuration.

In Patent No. 3,200,380, assigned to the same assignee as the present invention, there is described a data processing system in which a plurality of peripheral units communicate over one of several input/output channels with the main memory of the data processing system. This system greatly reduces the number of control units required for input/output control and permits communication with several peripheral units and main memory to take place contemporaneously.

The present invention represents a further improvement over the system described in the above-identified patent in that it provides communication between a number of peripheral units and main memory through a single input/output control channel on a multiplexed or time sharing arrangement. The input/output control of the present invention has several advantages in that is eliminates the need for an input/output exchange as is required in the system described in the above-mentioned patent to permit any selected peripheral unit to be connected to any selected one of the input/output channel controls.

Furthermore, the exchange between the memory modules and the input/output control units is simplified by the present invention since a single input/output channel is all that is required in contrast to the several input/output channels required heretofore. Since there is a single interface between the single input/output channel and the memory exchange, input/output priority weighting is eliminated.

These and other advantages are achieved, in brief, by a multiplexor control unit for transferring data to and from a plurality of peripheral units to one or more memory modules on a time sharing basis. The control unit comprises a buffer storage for storing a plurality of words, the word storage capacity being less than the number of peripheral units. An associative tag memory is used for addressing the buffer storage with means responsive to an initiating control signal for storing the designation address of a particular peripheral unit in the associative memory, and, at the same time, activating the corresponding peripheral unit. When a peripheral unit is ready to transfer information, either to or from a memory module, the peripheral unit generates an access signal and the access signal causes the associative tag memory to address an assigned word in the buffer storage. A character is then transferred between the particular peripheral unit and the selected location in the buffer storage. The same assigned word location in the buffer storage stores the address in memory and the number of words to be transferred to or from memory. After each transfer of a character between a peripheral unit and the buffer storage, control is released and any other peripheral unit can communicate with another assigned location in the buffer storage on a predetermined priority basis where more than one peripheral unit attempts to communicate at the same time. The associative tag memory permits a portion of the buffer memory to be assigned to a particular peripheral unit at the initiation of an input/output operation. At the completion of the input/output operation with a particular peripheral unit, the location in the buffer storage can be reassigned to another peripheral unit on the initiation of another input/output operation by the processor.

For a more complete understanding of the invention, reference should be made to the accompanying drawings wherein:

FIGURES 3A and 3B are a detailed schematic block diagram of the multiplexor unit incorporating the features of the present invention;

FIGURES 4A and 4B are a detailed schematic block diagram of the associative tag memory and the buffer memory of the input/output control unit;

FIGURE 5 is a schematic diagram of the timing and control logic for the multiplexor unit;

Figure 6A:
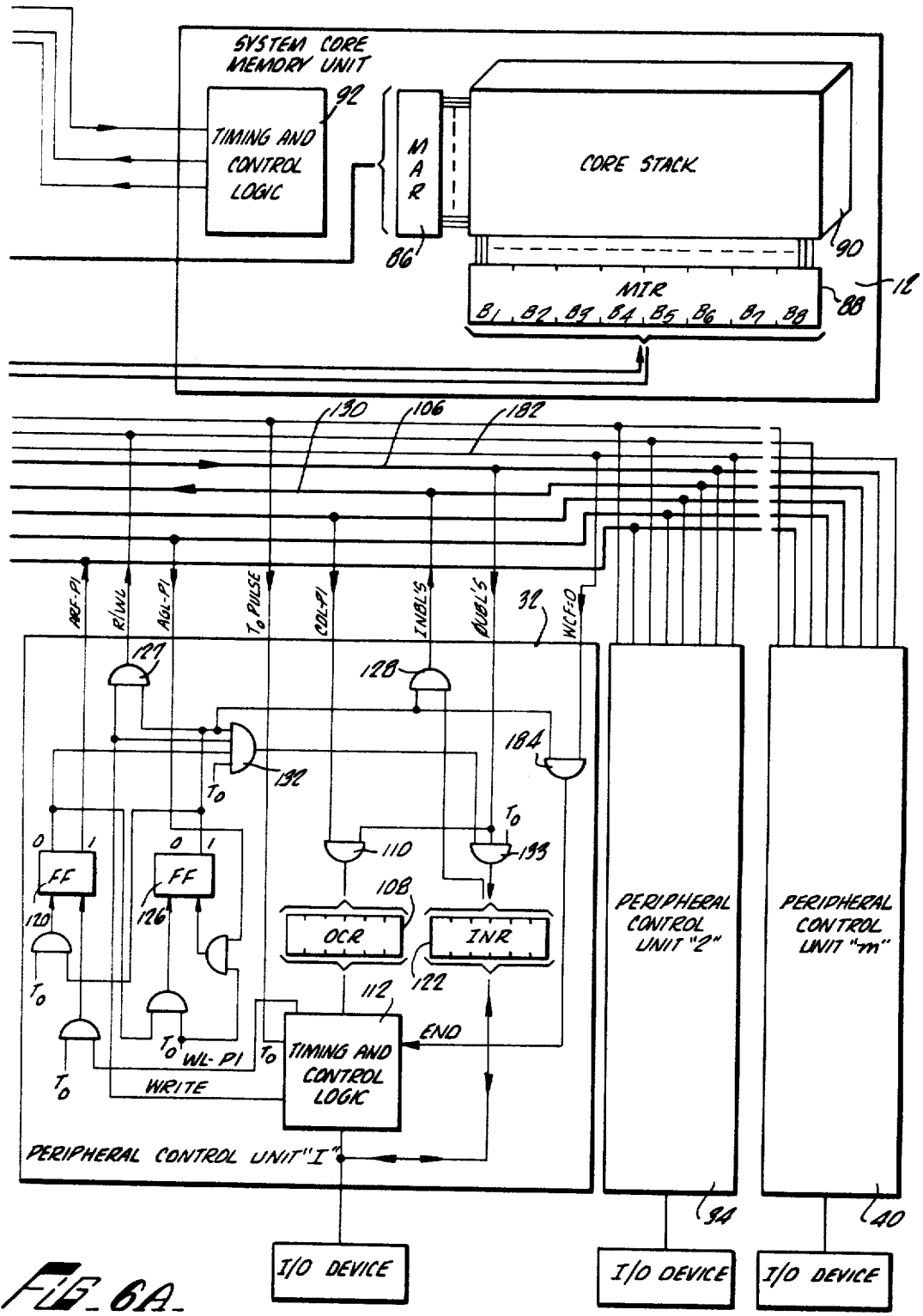

FIGURES 6A-C are a schematic diagram of one of the peripheral control units;

FIGURE 7 is a timing diagram of the initiation cycle by which an input/output operation through the control unit is initiated; and FIGURE 8 is a timing diagram of an access cycle in which data is transferred to a peripheral unit.

Figure 1:
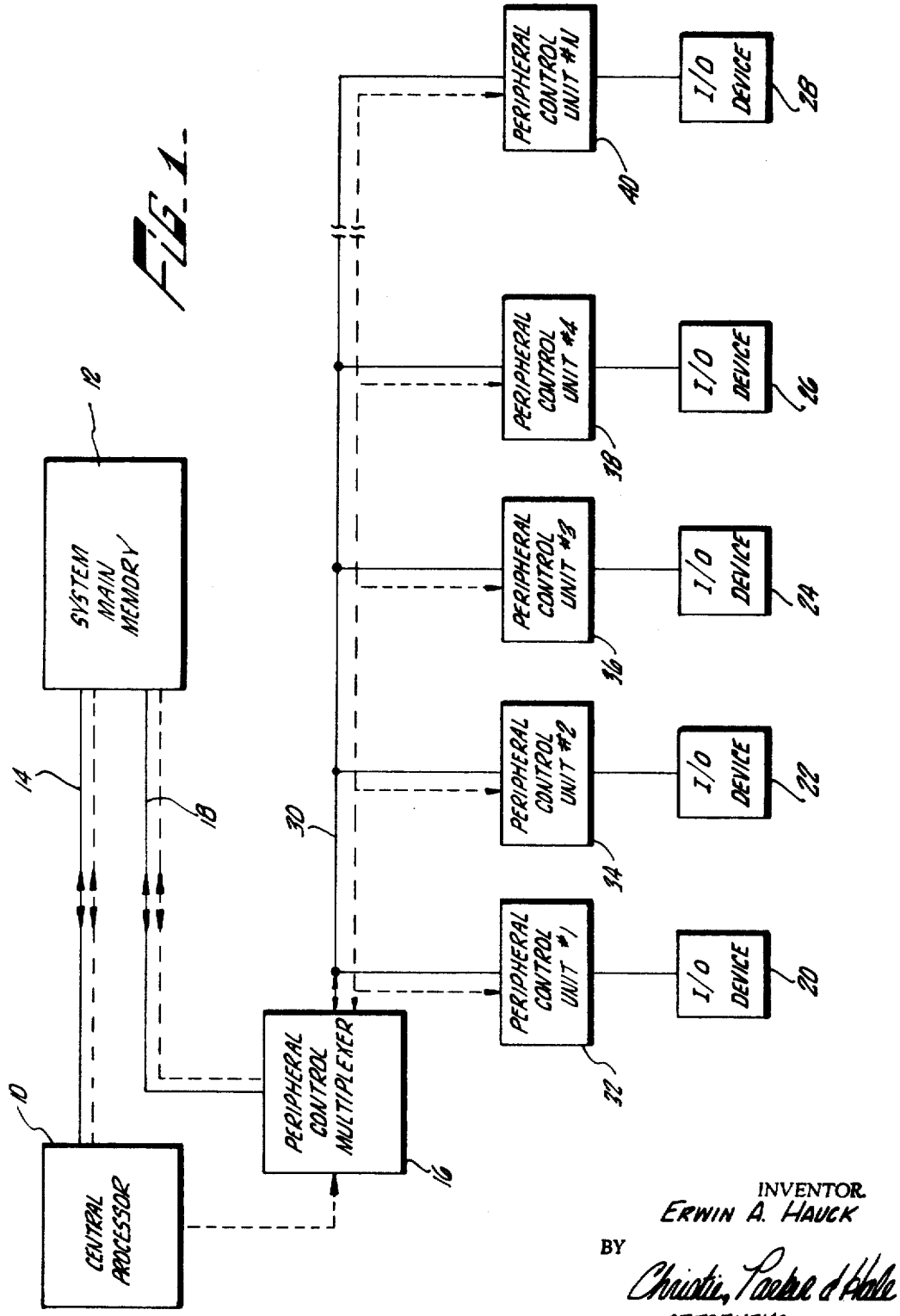
FIGURE 1 is a simplified block diagram of the data processing system including the input/output sub-system.

Referring to FIGURE 1, the data processing system typically includes a central processor 10 which communicates with a main memory 12. The memory 12 may include a plurality of memory modules and a memory exchange in the manner described in the above-identified patent. Communication between the central processor 10 and the memory 12 is under the control of the processor over a communication bus 14. The input/output sub-system includes a peripheral control multiplexor 16 which communicates with the memory 12 over a bus 18 and which communicates with a plurality of input/output devices, indicated generally at 20 through 28. Communication is through a bus 30 to a peripheral control unit associated with each input/output device, as indicated at 32 through 40. Typically, the input-output devices may comprise magnetic tape units, message printers, a keyboard, card readers, card punches, disk files, magnetic drums, or other well known types of peripheral devices for feeding data to or storing data from the processing system. While the number and type of peripheral units employed in a particular system is a matter of choice, a typical installation may include up to twenty or thirty such input/output devices. In addition to the data transfer buses 14, 18 and 30, there are control lines between each of the units as indicated by the dash lines in FIGURE 1.

In operation, as hereinafter will be described in more detail, the central processor signals the peripheral control multiplexor 16 when an input/output operation is to be initiated. The peripheral control multiplexor 16, when it is free, accesses the core memory 12 at a particular address location where an input/output descriptor has previously been stored in a pre-assigned location, the descriptor providing all the information necessary to effect the desired transfer of information between a designated peripheral unit and a specified field in memory.

Figure 2:
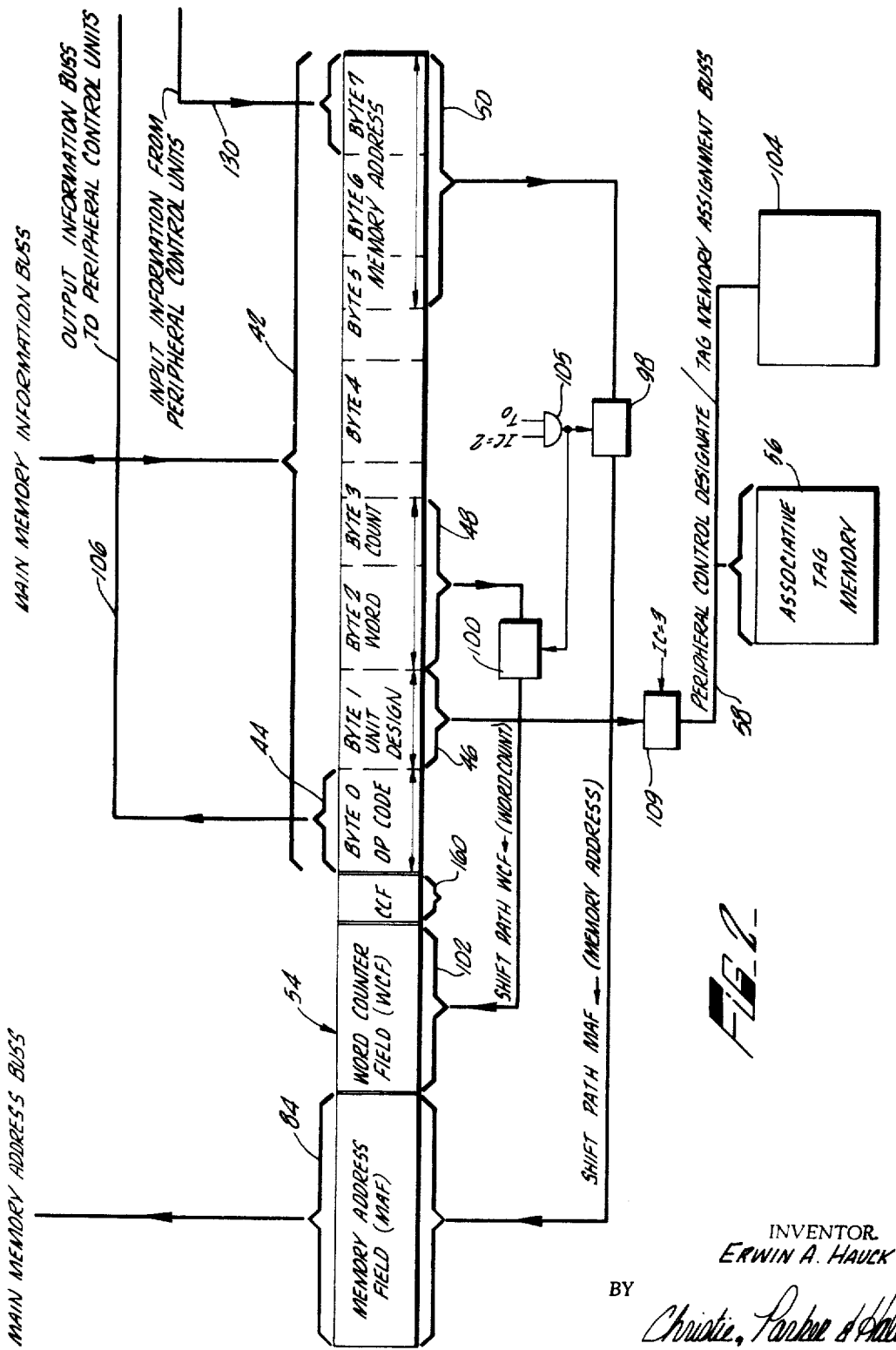
FIGURE 2 is a schematic showing of the buffer register in the multiplexor and shows the format of words stored in the buffer storage of the input/output control unit.

The format of an input/output descriptor word, hereinafter referred to as an I/O descriptor, as it is received by the peripheral control multiplexor 16 from the memory 12 over the information bus 18 is shown in FIGURE 2. A complete word in the memory 12 typically includes forty-eight binary bits, the forty-eight bits being shown within the bracket 42 in FIGURE 2. Six bits define the operation code, as indicated within the bracket 44. These bits define the particular operation which is to take place, such as reading information from a particular peripheral unit into memory, or writing into the particular peripheral unit from memory, or other required operations. The I/O descriptor includes another group of six bits, as indicated by the bracket 46, which designates the particular peripheral unit involved in the operation. A third group of ten bits, as indicated by the bracket 48, defines the number of words to be transferred to or from memory during the I/O operation. A fourth group of fifteen bits, as indicated by the bracket 50, defines the base address of the field in memory involved in the transfer operation.

A number of I/O descriptors can be stored in the peripheral control multiplexor 16 at one time. Once stored in the peripheral control multiplexor, the descriptors control the transfer of information between the designated peripheral unit and the core memory on a time sharing basis. Since different input/output devices transfer data at different rates, the peripheral control multiplexor 16 services the designated peripheral units on a priority basis to ensure a continual flow of data between the designated peripheral units and the main memory 12. The manner in which this is accomplished can best be understood by reference to the block diagrams of FIGURES 3, 4, 5 and 6 together with timing diagrams of FIGURES 7 and 8.

Figure 3A:
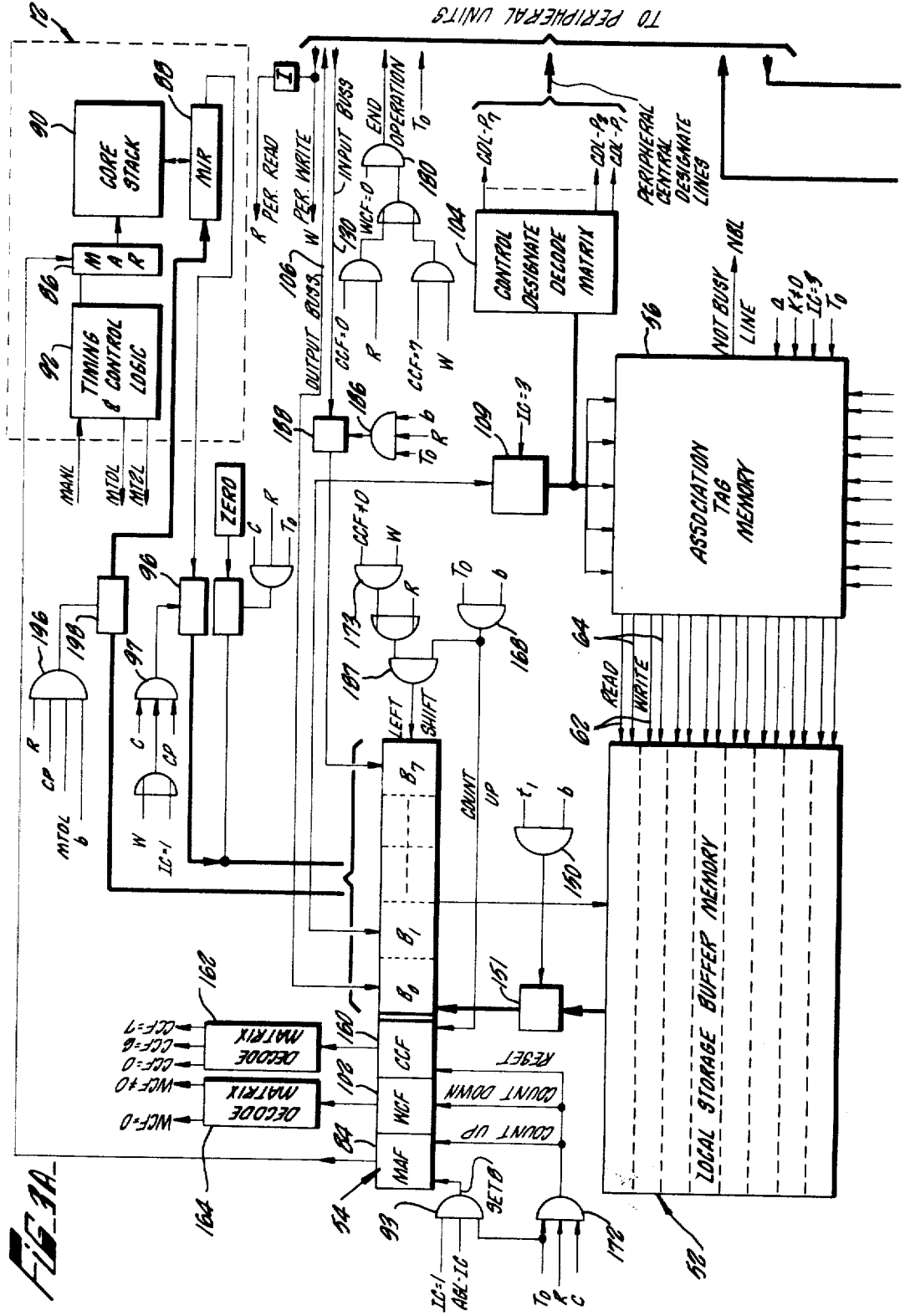

Referring to FIGURE 3 in detail, the peripheral control multiplexor 16 includes a local storage buffer memory 52, which typically stores four to eight words of seventy-six bits each. The number of words in the buffer memory 52 depends upon the maximum of peripheral units which the system is designed to service at one time. There is one word in the buffer memory for each peripheral unit with which the system is attempting to communicate at one time. This number is generally considerably less than the total number of peripheral units assigned to the system, since the system normally would have no need to communicate with all of the peripheral units at the same time.

Input and output to the buffer memory 52 is through a local storage buffer register 54. See also FIGURE 2. Words are written into a particular word location in the buffer memory from the register 54 or read out of a particular word location in the buffer memory 52 to the register 54 in response to an associative tag memory indicated generally at 56. The associative memory 56 may be of the type described in more detail in copending application Serial No. 236,310, filed November 8, 1962, entitled "Memory System" and assigned to the same assignee as the present invention. The associative tag memory, which is shown in more detail in FIGURE 4, includes an array of bistable elements arranged in columns and rows. The binary elements may be flip-flops, for example, and are designated $T^m{}_nFF$, where $m$ designates the row and $n$ designates the column in which the bistable element is located in the array. Each row in the associative memory array is arranged to store a single address of a designated peripheral unit. The address is established in the associative tag memory during the initiate cycle of operation by the central processor 10 in a manner hereinafter described in detail. The addresses are stored in the several rows of the associative tag memory over a group of input lines 58, which go respectively to each of the columns in the array. Only the uppermost row in the array in which the bistable elements are all in the zero state can receive a new address. When it is desired to read or write information into the local storage buffer memory 52 in a particular word position, the address corresponding to the designated peripheral unit is stored in a key register 60. The associative memory simultaneously compares the address in the key register 60 with the address stored in each row of the associative memory array and whenever a comparison exists between all the bits of the character stored in the key register 60 with all the bits in a particular row of the array, a corresponding one of the output lines, indicated at 62, selects the corresponding location in the buffer memory 52 for a read or write operation. The output lines from the associative memory shown in FIGURE 4 providing a read select operation on the buffer memory 52 are indicated at 62, while the write select lines are indicated at 64. Thus the associative tag memory 56 provides a means for assigning any one of the storage locations in the buffer memory to a designated peripheral unit at the time an input/output operation is initiated between the particular peripheral unit and the main memory 12.

*Initiate cycle*

The initiate cycle by which communication is initiated between a designated peripheral unit and a particular field in the memory 12 can best be understood by reference to the timing diagrams of FIGURE 7 as well as the schematic block diagram of FIGURES 2–6. The central processor 10 starts the initiating cycle by providing an Initiate level which sets an initiate counter 70 from the IC=0 state to the IC=1 state. The initiate counter 70 is part of the timing and control logic circuit 71, which is shown in more detail in FIGURE 5. The initiate counter 70 is advanced in response to a clock pulse CP from a clock timing circuit 72. It should be noted that the clock timing circuit 72 provides pulses on three outputs in succession which are combined to form the clock pulses CP. Every third pulse, designated $T_0$, is applied to all of the peripheral control units. An "and" gate 74 senses the Initiate level from the central processor 10 and also senses that the initiate counter 70 is in the IC=0 state and that there is a row in the associative tag memory 56 which is not storing a unit desigate address. This latter condition, indicated by the level on a Not Busy line NBL, is derived by adding outputs of a group of "and" gates in the associative memory (see FIGURE 4) indicated at 76, each "and" gate 76 sensing that all of the flip-flops in a particular row are in the zero state. If any of the rows does not contains a designate address, i.e., if all the binary elements are in the zero state, a Not Busy level is applied to the "and" gate 74 from the associative tag memory 56. The output waveform from the "and" circuit 74 is shown at line A of FIGURE 7. The states of the initiate counter 70 are shown at line B of FIGURE 7.

The IC=1 state from the initiator counter 70 is applied to a priority resolution matrix 78. The priority resolution matrix, in addition to receiving the IC=1 signal indicating that an initiate cycle is requested, receives signals from each of the peripheral control units indicating that a particular peripheral unit is ready to access the buffer memory 52. These access request signals are applied to the priority resolution matrix 78 from the respective peripheral control units over control lines designated $ARF-P_n$, where $n$ is the number of the peripheral control unit. When the timing and control logic 71 provides an "on" level at control signal output $a$, the priority circuit may activate on a predetermined priority basis one of a plurality of output lines designated $AGL-P_n$. These lines return to the corresponding peripheral units and signal that access is granted to one of the peripheral units based on the priority logic of the resolution matrix 78. The priority resolution matrix 78, on the lowest priority, also may signal, on the line indicated at AGL-IC, an access granted for an initiating cycle. While the logic of the priority resolution matrix 78 in FIGURE 3 is shown to give highest priority to the peripheral control unit #1 over line AGL-P$_1$ through the lowest priority to the initiating cycle over line AGL-IC, it will be understood that the order of priority can be arranged in any desired sequence. Normally, highest priority would be given to the peripheral unit having the highest rate of data flow, whereas an initiate cycle can only continue if no peripheral unit is signalling for access to the control multiplexor 16.

The control signal $a$ from the timing and control logic 71, as shown in FIGURE 5, is produced by the output of an "and" gate 79, which senses that three control flip-flops are all in the zero state. The three flip-flops include a priority timing control flip-flop (PTCF) 80, a memory access needed flip-flop (MANF) 82, and a memory access obtained flip-flop (MAOF) 94. These three flip-flops are normally in the zero or reset state at the start of an access cycle or an initiate cycle. The waveform of control signal $a$ is shown on line L of FIG. 7 while the states of the three control flip-flops 80, 82, and 94 are shown respectively at lines E, F and K of FIG. 7. The PTCF flip-flop 80 is set to state 1 or "on" at T$_0$ time by the output of an "and" gate 81 which senses that any of the AGL-P$_n$ lines or the AGL-IC line is on. This prevents access by any peripheral unit until the PTCF flip-flop 80 is reset.

Assuming that none of the peripheral control units has requested access, the priority resolution matrix 78 during the IC=1 state produces a signal on the AGL-IC line which is applied to set MANF 82 on. At the same time, the signal on the AGL-IC line sets the memory address field (MAF) portion of the register 54, indicated by the bracket 84, to a predetermined address, e.g. memory cell 8, where an I/O descriptor has previously been stored by the central processor 10. This is done with the next T$_0$ pulse by the output of an "and" gate 93 which senses the IC=1 state and that AGL-IC is true. See the waveform in line G of FIG. 7. To this end, an "and" gate 83 senses that AGL-IC is true and that the initiate counter 70 is in the IC=0 state. The next T$_0$ clock pulse sets the control flip-flop 82 on, which starts a memory cycle of the main memory 12.

When the memory control flip-flop 82 is turned on, it provides an "on" level on the control line MANL to the main memory 12 and initiates a memory cycle in the main memory 12 using the address in the memory address field section 84 of the register 54. The main memory 12 is of conventional design and includes a memory address register (MAR) 86, a memory information register (MIR) 88 associated with a core stack 90. Under control of the timing and control logic 92, the memory cycle causes the word in the location identified by the contents of the address register 86 to be placed in the information register (MIR) 88. The timing and control logic 92 provides an output level, designated MT2L, at the time the information is available in the information register 88. This level turns on the control flip-flop (MAOF) 94 by means of an "and" gate 85 which gates the next CP clock pulse in response to the MT2L level through an "or" gate 87 to the control flip-flop 94. Both the flip-flops 82 and 94 are turned off or reset by the CP clock pulse applied through an "and" gate 89. See waveform H and J of FIGURE 7.

When both the control flip-flops 82 and 94 are turned on, an "and" gate 95 having a control signal output $c$ goes true. See waveform M of FIG. 7. The I/O descriptor from the MIR register 88 is now transferred by a gate 96 to the descriptor section 42 of the buffer register 54. The gate 96 is controlled by the output of an "and" gate 97 which senses the control signal $c$, the IC=1 state, and the next CP clock pulse. See line N of FIG. 7. At the same time, the initiate counter 70 is set to the IC=2 state by the output of an "and" gate 99 (FIG. 5) which also senses IC=1, the control signal $c$, and the next CP clock pulse.

During the IC=2 state, all operations are synchronized with the T$_0$ pulse from the timing circuit 72 so that the operations are synchronized with the operation of the peripheral control units. During the IC=2 state, the PTCF flip-flop 80 is reset by the output of an "and" gate 101 which senses the IC=2 state through an "or" gate 103. Also, as shown in FIGURE 2, the memory address portion 50 of the I/O descriptor now stored in the buffer register 54 is transferred by means of a gate 98 to the memory address field (MAF) 84 of the buffer register 54. See waveform V of FIG. 7. The gate 98 is turned on in response to a T$_0$ timing pulse during the IC=2 state through "and" gate 105. Similarly, a gate 100 transfers the word count portion 48 of the I/O descriptor in the buffer register 54 to a counter field (WCF) indicated by the bracket 102 in the buffer register 54. See waveform W of FIG. 7. At the same time, the initiate counter 70 is advanced to the IC=3 state by the output of "and" gate 107.

During the IC=3 state of the initiate counter 70, the unit designate field 46 in the buffer register 54 is applied to a decoding circuit 104 through a gate 109 which raises the control level on one of $n$ output lines, designated CDL-P$_n$, which go to the respective peripheral control units. Thus if the I/O descriptor in the buffer register 54 designates peripheral control unit #1, the output line CDL-P$_1$ from the decoder 104 is set. At the same time, the operation code in the section 44 of the buffer register 54 is applied to the output information bus, indicated at 106, which goes to all of the peripheral control units.

Also during the IC=3 state of the initiate counter 70, a storage location in the buffer memory 52 must be assigned to the designated peripheral unit. To this end, the unit designate portion 46 of the register 54 is also coupled by the gate 109 to the input lines 58 of the associative tag memory 56. See FIGURE 4. At this time, the key register 60 has been cleared and so is set in the zero state by the output of an "and" gate 111. The "and" gate 111 responds to the control signal $a$ and an inverter 91 indicating that no AGL-P$_n$ line is set. See waveform S of FIG. 7. As a result, the unit designate address is set into the highest row in the associative memory matrix that does not already contain a unit designate address, i.e., is not set to zero.

The logic for setting the unit designate address into the tag memory 56 may be seen in FIGURE 4 in detail. If, for example, the uppermost row of bistable elements in the matrix are all set to zero and the bistable elements of the key registers 60 are all set to zero, the output of an "and" gate 114 will be true. This permits a T$_0$ pulse to be gated through an "and" circuit 116 to set each of the bistable elements to the proper state as determined by the levels on the input lines 58. At the same time, an inverter 118 applies a false level to one input of the corresponding "and" gates associated with each of the other rows in the matrix, thus preventing any of the other rows from being set to the unit designate address. If the first row already contains a unit designate address, the output of the "and" gate 114 will not be true but the output of the inverter 118 will be true, permitting the unit designate address to be set into the second row in the matrix.

The output of an "and" circuit 115 which senses the IC=3 state and the T$_0$ clock pulse, in addition to setting the unit designate address into one of the rows of the associative memory matrix also causes a Write operation by which the contents of the buffer register 54 is placed in the corresponding word location of the local storage buffer memory 52. Thus a write select signal is applied to the corresponding word location in the buffer memory by the output of an "and" circuit 120 in response to the output of the "and" circuit 115 and the output of the "and" circuit 114. The same clock pulse T$_0$ resets the initiate counter 70 back to the IC=0 state through "and" gate 119 which senses the IC=3 state, thus completing the initiate cycle. See waveforms T and U of FIG. 7.

From the above description, it will be seen that at the end of the initiate cycle, a particular word location in the local storage buffer memory has been set aside and assigned by means of the associative tag memory to the designated peripheral unit. The portion of the I/O descriptor specifying the address of the field in memory as well as the number of words to be transferred between memory and a peripheral unit has been stored in the buffer memory. At the same time, the operation code is present on the output bus to the peripheral control units to initiate operation of the designated peripheral control unit. At this point, the peripheral control multiplexor 16 idles until either the central processor 10 starts a new initiate cycle or until one of the activated peripheral control units signals that it is ready to either transmit or receive a character of data.

*Access cycle*

At this point the operation of the peripheral control units should be considered. Referring to FIG. 6, when one of the unit designate lines, for example, CDL-$P_1$ is set during the initiate cycle (see waveform P of FIG. 7), the CDL line opens an "and" gate 110 that couples the operation code storing register (OCR) 108 to the output bus 106. The next $T_0$ pulse strobes the register 108, storing the operation code. A timing and control logic circuit 112 in response to the contents of the OCR register 108 starts operation of the associated input/output device.

When the input/output device is ready to receive or transmit a character, an access request flip-flop (ARF) 120 is set at $T_0$ time by the timing and control logic circuit 112. See waveform A of FIG. 8. This may occur in a number of peripheral control units at the same time. This indicates that the particular peripheral control unit is ready to receive or transfer out a character of information from a single character buffer register (INR) 122 in the peripheral control unit. hTe flip-flop 120, when set to 1, sets a corresponding high level on an access request line, designated ARF-$P_n$, where $n$ is the number of the peripheral control unit. These access request lines are applied to the priority resolution matrix 78 which, as described above, assigns a predetermined priority to simultaneous requests. Assuming that the peripheral control #1 is one of the units requesting access, an "and" circuit 124 in the priority matrix 78 senses that the control signal $a$ is on and that the ARF-$P_1$ line is true. The output of the "and" circuit 124 establishes an access granted level on a line AGL-$P_1$ which returns to the peripheral control unit #1 and sets an access granted flip-flop (AGF) 126 with the next $T_0$ pulse. See waveforms B and C of FIG. 8. When the flip-flop 126 is set, it couples the character buffer register 122 through a gate 128 to an input bus 130. An "and" gate 132 senses when a peripheral write operation is indicated by the WL-$P_1$ line and the ARF 120 is off and AGF is on and passes a $T_0$ pulse to a gate 133 which strobes the coded signal levels on the output bus 106 into the INR register 122. The ARF flip-flop 120 and AGF flip-flop 126 are turned off by successive $T_0$ pulses.

The output lines from the priority resolution matrix 78 are also applied to a code converter circuit 136 which establishes the corresponding unit designation code in the key register 60 for the associative tag memory 56. The output of the key register 60 is applied to a decoding circuit 138 which provides two outputs designated K=0 and K≠0, indicating the condition of the key register 60.

As pointed out above, the outputs from the priority resolution matrix are used to turn on the priority timing control flip-flop 80 by means of an "and" circuit 81 to which is applied the sum of the outputs from the priority resolution matrix 78 applied to the "and" circuit 81 together with the control signal $a$. This sets the priority timing control flip-flop 80 to the 1 state in response to the next $T_0$ pulse. See waveform E of FIGURE 8.

The same $T_0$ clock pulse is used to write the contents of the buffer register 54 into the assigned word location in the local storage buffer memory 52. To this end, an "and" circuit 140 in the associative tag memory 56 (see FIGURE 4) senses the K≠0 condition of the key register 60 and senses that the three control flip-flops 80, 82 and 94 are in their 0 state as indicated by the control output $a$ from the "and" circuit 79. By this means, information placed in the buffer register 54 during a previous access cycle by a previous peripheral control unit is now loaded into the previously designated location in the associative tag memory, since the key register 60 does not get changed until the $T_0$ clock pulse received at the end of this cycle of operation. See waveform F of FIG. 8.

The key register 60 is set to the designated address by the output of the priority circuit 78 by a clock pulse $T_0$ applied to an "and" gate 142 along with the control signal $a$, the sum of the output lines $\Sigma$AGL-$P_n$ from the priority circuit 78. On the other hand, if none of the AGL-$P_n$ lines is true, the "and" gate 111 clears the key register 60 forcing it to a 0 state.

Assuming that the key register 60 has been set to a designated address by the output of the priority circuit 78, following the clock time $T_0$ in which the key register is set to the designated address and the priority timing control flip-flop 80 has been set to the 1 state, the transfer operation takes place between the particular peripheral control unit and the buffer memory 52 and, if required, between the buffer memory 52 and the main memory 12. An "and" gate 148 in the timing and control logic circuit 71 senses that the PTCF flip-flop 80 is in the 1 state and that the K≠0 state exists, producing a control signal $b$. See waveform H of FIG. 8. The control signal $b$ together with the next clock pulse $t_1$ are applied to a gate 150, the output of which gates through at gate 151 the read-out levels of the local storage buffer memory 52 into the buffer register 54.

At this point, operation of the access cycle differs depending upon whether a peripheral Read operation or a peripheral Write operation is indicated by the peripheral control unit as determined by the output level from the "and" gate 127 in the peripheral control unit. Assuming that a Write operation is called for in which information is to be transferred to the peripheral control unit over the output information bus 106, the character count field CCF, indicated at 160, in the register 54 is decoded by a circuit 162. If seven characters have already been transferred to the peripheral control unit, leaving one character in the information portion 42 of the register 54, the decoding circuit 162 provides a signal on the CCF=6 output, whereas if eight characters have been transferred, the decoding circuit provides an output on the CCF=7 line from the decoder. Similarly, a decoder 164 is connected to the word count field (WCF) 102 of the register 54, the decoder indicating whether the word count field is 0 or not 0 and providing a corresponding level on the output lines WCF=0 and WCF≠0. If the character count is 6, indicating that one more character is to be transferred to the peripheral control unit, and if the word count field has not been reduced to 0, it is necessary at this point to initiate a memory cycle to bring in a new word of data from the core memory 12 to be stored in the local storage buffer memory 52 after the remaining character is transferred to the peripheral unit. The memory cycle is initiated by turning on the MANF flip-flop 82 at $t_2$ time in response to the output of an "and" circuit 166 (see FIG. 5) which senses that CCF=6, that WCF≠0, that the write condition W is present, and that control signal $b$ is set. See waveform K of FIG. 8.

The following $T_0$ clock pulse is applied through an

"and" circuit 168, to count up the character count field 160 by one. At the same time, if the count condition of CCF is not zero, the information section 42 of the register 54 is shifted left one character position to the left in response to "and" gate 187 that sense the write condition W and the CCF≠0 condition at the output of "and" gate 173 to bring the next character in the word into the position for transfer to the peripheral control unit over the output bus 106. See waveforms L and M of FIG. 8. Also at this time the PTCF flip-flop 80 is reset by the output of the "and" gate 101 since the K≠0 condition pertains.

The next character in the data word is now available on the bus 106 and is placed in the INR register 122 of the peripheral control unit by the next $T_0$ clock which strobes the register 122 through the "and" gates 132 and 133 as described above. See waveform N of FIG. 8.

Assuming that no memory cycle was involved so that the MANF flip-flop 82 would not be set at this time, the access operation is now complete and the priority resolution matrix 78 is free to initiate a new access cycle or an initiate cycle. This condition is indicated by the dotted lines in the waveforms of FIG. 8. However, if a memory cycle was required to bring in a new data word, the control flip-flop 82 would be turned on as described. When the memory cycle has reached the point where a new data word is in the memory information register 88 as derived from the address location specified by the memory address field (MAF) 84 in the register 54, the MT2L level sets the MAOF flip-flop 94 on. See waveforms O, P, and Q of FIG. 8. With both control flip-flops 82 and 94 on, control signal c is set. Control level W, indicating a Write operation, is applied to the gate 97 to transfer the contents of the MIR register 88 into the information section 42 of the register 54 through gate 96. At the same time, the word count field (WCF) 102 is counted down one and the memory address field (MAF) 84 is counted up one by the output of an "and" gate 172. Also the character count field 160 is reset to 0.

The above access cycles are repeated whenever a peripheral control unit calls for access to bring information in from the main memory 12. When the last character in the field has been transferred to the particular peripheral control unit, the word count field 102 is reduced to 0 and the character count field 160 is at 7. This is sensed by an "and" gate 180 which provides a signal on a bus 182 to each of the peripheral control units. An "and" gate 184 in the designated peripheral control unit senses that the AGF flip-flop 126 is on and applies a termination signal to the timing and control logic 112 to turn off the peripheral control unit and stop the associated I/O device. The same level is used to clear the corresponding row in the tag memory 56 through an associated "and" gate 185.

The above-described access cycle was described in connection with a write operation in which data is transferred to a peripheral unit. In case a read operation is called for by the peripheral unit, the access cycle is modified somewhat. The priority resolution and addressing of the local storage buffer memory 52 by the tag memory 56 is the same. Once the buffer register 54 is loaded, the character in the buffer register 122 of the particular peripheral control unit is applied to the input information bus 130 through the gate 128. This character is first set into the righthand character position B7 of the register 54. This is done by an "and" circuit 186 which senses the read condition R applies and that the control signal b is true. The next $T_0$ clock strobes the character through a gate 188 into the register 54. The information section 42 of the buffer register 54 is by the output of the "and" gate 168 through an "and" gate 187 which sense that the read operation control signal R is present.

If the character count field (CCF) 160 is in the count 7 condition, indicating that the last character required to complete a word in the information field in the register 54 is being transferred over bus 130, a memory cycle is initiated to transfer the word into the main memory 12. To this end, the MANF flip-flop 82 (see FIG. 5) is turned on in response to the output of an "and" circuit 190 which senses that a readout operation is taking place, that the CCF=7 condition is true, and that the output b of the gate 148 is true. The next clock pulse $T_0$ then sets the MANF flip-flop 82 on, initiating a memory cycle. When the memory 12 is ready to receive a word of information, the timing and control logic 92 puts out a level MTOL which turns on the MAOF flip-flop 94 by means of the CP clock pulse through an "and" gate 191. The R level together with a $T_0$ clock is applied through an "and" circuit 196 to a gate 198 which transfers the word in the information section 42 of the register 54 to the memory information register 88 in the core memory 12. The word count field (WCF) 102 and the memory address field (MAF) 84 are then counted down and counted up respectively by the output of "and" gate 172. When the word count field WCF is counted down to 0 and CCF=0, the operation of the peripheral control unit is stopped by the output of the "and" circuit 180.

In summarizing the operation, it will be seen that the priority resolution matrix 78 provides a means by which any one of the peripheral control units when requesting access is assigned to a particular location in the local storage buffer memory whenever no other peripheral control unit of higher priority has been granted access. It will be seen that the access cycle takes only two $T_0$ clock pulse time intervals. The priority resolution matrix is cycled by the priority timing control flip-flop which is normally set and reset by successive $T_0$ clocks. The transfer between the register 54 and the peripheral control unit is delayed one or two $T_0$ clock times depending upon whether a read or a write operation is taking place. In the event that a transfer between the local storage buffer memory 52 and the core memory 12 is required, a third $T_0$ clock pulse interval is required to complete the access cycle. Since the rate at which characters are transferred into and out of the I/O devices is many times slower than the clock rate, there is no problem for the multiplexor to service a large number of peripheral units at one time. Thus while the buffer memory 52 and associative tag memory 56 have been described as providing, for example, four to eight words of storage, it is possible that the multiplexing system can accommodate simultaneous operation of even more I/O devices, depending upon the data flow rate of the I/O devices incorporated into the system.

What is claimed is:

1. In a computing system in which data is transferred between at least one memory module and a plurality of peripheral input/output units in response to an initiating control signal from a processor, a multiplex control unit for transferring data to and from the plurality of peripheral units on a time sharing basis, said control unit comprising a buffer memory for storing a plurality of words, the word storage capacity being less than the number of peripheral units, an associative memory for addressing the buffer memory, means responsive to said initiating control signal for storing an address corresponding to a particular peripheral unit in the associative memory and activating the corresponding peripheral unit, means associated with each peripheral unit for generating an access signal when it is ready to receive or send a data character, means responsive to the access signal from a particular peripheral unit for addressing the associative memory to select the corresponding location in the buffer memory, and means responsive to the selection of the location in the buffer memory for initiating transfer of a character between the particular peripheral unit and the selected location in the buffer memory.

2. Apparatus as defined in claim 1 further including means for storing a character count number in the buffer memory at the selected location, a character count register, means responsive to selection of the location in the buffer memory associated with a particular peripheral unit for loading the character count register with said character count number from the selected location in the buffer memory, and means for changing the count condition of the character register with each character transferred between the buffer memory and a peripheral unit.

3. Apparatus as defined in claim 2 further including means responsive to an initiating control signal for storing a memory module address in the buffer memory at the selected location, a memory address register, means responsive to the selection of the location in the buffer memory for loading the address register with said address means controlled by the character counter with said address means controlled by the character counter when a predetermined count condition exists for transferring the characters stored in the selected location in the buffer memory to the address in the memory module identified by the address in the address register.

4. Apparatus as defined in claim 1 wherein said means for addressing the associative memory further includes a priority circuit for receiving said access signals from the peripheral units, the priority circuit addressing only one address in the associative memory according to a predetermined priority of peripheral unit addresses when two or more access signals are received.

5. Apparatus as defined in claim 4 further including means for applying a signal to the priority circuit in response to the initiating control signal, the priority circuit activating said means for storing an address in the associative tag memory only if no access signals are received by the priority circuit.

6. In a computer system in which data is transferred between a plurality of bulk storage peripheral units and one or more addressable high speed memory modules in response to descriptors generated by a processor, each descriptor specifying in coded form the designation of the peripheral unit, the base address in the memory module, and the number of data words to be transferred, apparatus for controlling the transfer comprising temporary storage means for storing a group of separately addressable words, means for selectively addressing any one of said words including an associative tag memory, a key register, the tag memory selectively addressing one of the words in the storage means by comparing the contents of the key register with a group of addresses stored in the tag memory, means responsive to a signal received from the processor for storing the peripheral unit designation portion of a descriptor as an address in the tag memory and activating the designated peripheral unit, means for storing the base address and word number of the descriptor as part of the word in the temporary storage means addressed by the unit designation portion of the descriptor stored in the tag memory, means in each of said peripheral units for generating an access signal when it is ready to transfer a character of data, means responsive to an access signal for loading the key register with the unit designation of the signalling peripheral unit, whereby the corresponding word location in the temporary storage means is addressed, and means responsive to the addressing of the word in temporary storage for transferring a character between the corresponding peripheral unit and part of the addressed word in the temporary storage unit.

7. Apparatus as defined in claim 6 wherein said means for loading the key register includes a priority circuit receiving said access signals, the priority circuit setting the key register on a predetermined priority basis when more than one access signal is received at one time.

8. Apparatus as defined in claim 7 further including means for releasing the priority circuit to load a different unit designation in the address register in response to said access signals after each transfer of a character between the temporary storage means and a peripheral unit.

9. Apparatus as defined in claim 8 further including means for indicating the number of characters transferred to a particular address location in the temporary storage means, means responsive to said indicating means when a predetermined number of characters have been transferred between a peripheral unit and the temporary storage means initiating the transfer of a word of characters between the temporary storage means and said particular location in the temporary storage means, said transferring means including means for addressing the memory module from the base address information stored in said particular address location in the temporary storage means, and means for incrementing the base address portion of the word stored in the particular location each time a word of characters is transferred to the memory module.

10. Apparatus as defined in claim 9 further including means for decrementing the word count portion in a particular location in the temporary storage unit each time a group of characters is transferred between said particular location to the memory module and the temporary storage means, and means for clearing the corresponding address stored in the tag memory when the word count is reduced to zero, whereby a new unit designation from a subsequent descriptor can be stored in the same location in the tag memory.

References Cited

UNITED STATES PATENTS

| 3,200,380 | 8/1965 | MacDonald et al. | 340—172.5 |
| 3,297,996 | 1/1967 | Grady | 340—172.5 |
| 3,303,476 | 2/1967 | Moyer et al. | 340—172.5 |

PAUL J. HENON, *Primary Examiner.*

R. B. ZACHE, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,408,632                         October 29, 1968

Erwin A. Hauck

It is certified that error appears in the above identified patent and that said Letters Patent are hereby corrected as shown below:

Column 4, line 50, "contains" should read -- contain --; line 57, "initiator" should read -- initiate --. Column 7, line 42, "hTe" should read -- The --; line 49, before "#1" insert -- unit --. Column 9, line 10, cancel "the", second occurrence; line 67, before "the read condition" insert -- that --. Column 11, lines 14 and 15, after "character counter", first occurrence, cancel "with said address means controlled by the character counter".

Signed and sealed this 10th day of March 1970.

(SEAL)
Attest:

Edward M. Fletcher, Jr.                      WILLIAM E. SCHUYLER, JR.
Attesting Officer                                Commissioner of Patents